(12) United States Patent
Simons et al.

(10) Patent No.: US 10,489,959 B2
(45) Date of Patent: Nov. 26, 2019

(54) GENERATING A LAYERED ANIMATABLE PUPPET USING A CONTENT STREAM

(71) Applicant: Adobe Inc., San Jose, CA (US)

(72) Inventors: David Simons, Seattle, WA (US); Jakub Fiser, Prague (CZ)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/786,558

(22) Filed: Oct. 17, 2017

(65) Prior Publication Data

US 2018/0350123 A1 Dec. 6, 2018

Related U.S. Application Data

(60) Provisional application No. 62/515,994, filed on Jun. 6, 2017.

(51) Int. Cl.
| | |
|---|---|
| G06T 13/40 | (2011.01) |
| G06K 9/00 | (2006.01) |
| G06T 7/194 | (2017.01) |
| G06T 7/11 | (2017.01) |
| G06T 7/73 | (2017.01) |
| G06T 7/90 | (2017.01) |
| G06T 3/00 | (2006.01) |
| G06T 5/00 | (2006.01) |

(Continued)

(52) U.S. Cl.
CPC .......... *G06T 13/40* (2013.01); *G06K 9/00228* (2013.01); *G06K 9/00281* (2013.01); *G06K 9/00315* (2013.01); *G06T 3/0068* (2013.01); *G06T 3/0093* (2013.01); *G06T 5/002* (2013.01); *G06T 5/50* (2013.01); *G06T 7/11* (2017.01); *G06T 7/194* (2017.01); *G06T 7/73* (2017.01); *G06T 7/90* (2017.01); *G06T 11/001* (2013.01); *G06T 13/80* (2013.01); *G06T 15/04* (2013.01); *G06T 7/60* (2013.01); *G06T 15/02* (2013.01); *G06T 2207/10016* (2013.01); *G06T 2207/20076* (2013.01); *G06T 2207/20221* (2013.01); *G06T 2207/30201* (2013.01)

(58) Field of Classification Search
None
See application file for complete search history.

(56) References Cited

U.S. PATENT DOCUMENTS

2014/0035929 A1* 2/2014 Matthews ............... G06T 13/40
345/473
2016/0071544 A1* 3/2016 Waterston ............ G11B 27/034
386/278

OTHER PUBLICATIONS

Rematas, Konstantlinos, et al., "Novel View of Objects From a Single Image", arXiv:1602.00328v2, Aug. 15, 2016, 14 pages.

(Continued)

*Primary Examiner* — Edward Martello
(74) *Attorney, Agent, or Firm* — Kilpatrick Townsend & Stockton LLP

(57) ABSTRACT

Certain embodiments involve automatically generating a layered animatable puppet using a content stream. For example, a system identifies various frames of a content stream that includes a character performing various gestures usable for generating a layered puppet. The system separates the various frames of the content stream into various individual layers. The system extracts a face of the character from the various individual layers and creates the layered puppet by combining the individual layers and using the face of the character. The system can output the layered puppet for animation to perform a gesture of the various gestures.

22 Claims, 24 Drawing Sheets

(51) Int. Cl.
  *G06T 5/50* (2006.01)
  *G06T 11/00* (2006.01)
  *G06T 13/80* (2011.01)
  *G06T 15/04* (2011.01)
  *G06T 7/60* (2017.01)
  *G06T 15/02* (2011.01)

(56) References Cited

OTHER PUBLICATIONS

Shih, Yichang, et al., "Style Transfer for Headshot Portraits", Association for Computing Machinery, Proceedings of ACM Siggraph 2014, vol. 33, Issue 4, Article 148, Jul. 2014, 14 pages.

Liu Sifei, et al., "Multi-Objective Convolutional Learning for Face Labeling", IEEEConfernce on Computer Vision and Pattern Recognition, Jun. 2015, 9 pages.

Fiser, Jakub, et al., "Color Me Noisy: Example-Based Rendering of Hand-Colored Animations with Temporal Noise Control", Computer Graphics Forum, vol. 33, Issue 4, Jul. 2014, 10 pages.

Bénard, Pierre., "Stylizing Animation by Example". ACM Transactions on Graphics, vol. 32, Issue 4, Article 119, Jul. 2013, 12 pages.

Berger, Itamar, et al., "Style and Abstraction in Portrait Sketching" ACM Transactions on Graphics, vol. 32, Issue 4, Article No. 55, 63 pages.

Chen, Hong, et al., "Example-Based Automatic Portraiture," In Proceedings of Asian Conference on Computer Vision, Jan. 2002, 6 pages.

Chen, Hong, et al., "PicToon: A Personalized Image-Based Cartoon System," In Proceedings of ACM International Conference on Multimedia, Dec. 2002, 8 pages.

Chen, Hong, et al, "Example-Based Composite Sketching of Human Portraits," In Proceedings of International Symposium on Non-Photorealistic Animation and Rendering, Jun. 2004, 8 pages.

Decarlo, Decarlo, et al., "Stylization and Abstraction of Photographs,"ACM Transactions on Graphics vol. 21, Issue 3, Jul. 2002, 8 pages.

Dipaola, Steve, "Painterly Rendered Portraits From Photographs Using a Knowledge-Based Approach," In Proceedings of SPIE Human Vision and Electronic Imaging, vol. 6492, 2007, 10 pages.

Efros, Alexei. A., et al., "Image Quilting for Texture Synthesis and Transfer," In SIGGRAPH Conference Proceedings, 2001, 6 pages.

Fiser, Jakub., et al., "Color Me Noisy: Example-Based Rendering of Hand-Colored Animations With Temporal Noise Control," Computer Graphics Forum 33, 4, 2014, 10 pages.

Fiser, Jakub., et al., "Stylit: Illumination-Guided Example-Based Stylization of 3D Renderings," aCM Transactions on Graphics, vol. 35, Issue 4, Article 92, Jul. 2016, 11 pages.

Gatys, Leon A., et al, "Image Style Transfer Using Convolutional Neural Networks," In Proceedings of the IEEE Conference on Computer Vision and Pattern Recognition, 2016, 10 pages.

Gong, Yihong, et al., "Detection of Regions Matching Specified Chromatic Features," Computer Vision and Image Understanding, vol. 61, No. 2, 2 pages.

Gooch, Bruce, et al., "Human Facial Illustrations: Creation and Psychophysical Evaluation," ACM Transactions on Graphics, vol. 23, Issue 1, Jan. 2004, 13 pages.

Grady, Leo, "Random walks for image segmentation," IEEE Transactions on Pattern Analysis and Machine Intelligence, vol. 28, No. 11, 17 pages.

Hays, James, et al., "Image and Video Based Painterly Animation," In Proceedings of International Symposium on Non-Photorealistic Animation and Rendering, Jun. 2004, 8 pages.

Hertzmann, Aaron, et al., "Image Analogies," In SIGGRAPH Conference Proceedings, 2001, 14 pages.

Jamrisk Ondrej, et al., "LazyFluids: Appearance Transfer for Fluid Animations," ACM Transactions on Graphics, vol. 34, Issue 4, Article 92, Aug. 2015, 10 pages.

Kazemi, Vahid, et al., "One Millisecond Face Alignment With an Ensemble of Regression Trees," In Proceedings of IEEE Conference on Computer Vision and Pattern Recognition, 2014, 8 pages.

Kemelmacher-Shlizerman, Ira, "Transfiguring portraits" ACM Transactions on Graphics 35, 4, 942016, 8 pages.

Kwatra, Vivek, et al., "Texture Optimization for Example-Based Synthesis," ACM Transactions on Graphics, vol. 24, Issue 3, 2005, 8 pages.

Kyprianidis, Jane Eric, et al., "State of the 'Art': A Taxonomy of Artistic Stylization Techniques for Images and Video," IEEE Transactions on Visualization and Computer Graphics 19, 5, 2012, 20 pages.

Levin, Anat, et al., "A Closed-Form Solution to Natural Image Matting," IEEE Transactions on Pattern Analysis and Machine Intelligence, 30, 2, 2008, 8 pages.

Li, Hongliang, et al., "Guided face cartoon synthesis," IEEE Transactions on Multimedia, vol. 13, 6, Dec. 2011, 1 page.

Liu, Ce, et al., "Sift Flow: Dense Correspondence Across Scenes and Its Applications," IEEE Transactions on Pattern Analysis and Machine Intelligence, vol. 33, 5, 2011, 17 pages.

Meng, Meng, et al., "Artistic Paper-Cut of Human Portraits," In Proceedings of ACM Multimedia, 2010, 4 pages.

Newson, Alasdair, et al., "Video Inpainting of Complex Scenes," SIAM Journal of Imaging Science 7, 4, 27 pages.

Noris, G., et al. "Temporal Noise Control for Sketchy Animation," In Proceedings of International Symposium on Non-photorealistic Animation and Rendering, 6 pages.

Orzan, Alexandrina, et al., "Diffusion Curves: a Vector Representation for Smooth-Shaded Images," ACM Transactions on Graphics, vol. 27, Issue 3, 9, 8 pages.

Portilla, Javier, et al., "A Parametric Texture Model Based on Joint Statistics of Complex Wavelet Coefficients," International Journal of Computer Vision 40, 1, 23 pages.

Ruder, Manuel, et al., "Artistic Style Transfer for Videos," In Proceedings of German Conference Pattern Recognition, 21 pages.

Schaefer, Scott, et al., "Image Deformation Using Moving Least Squares," ACM Transactions on Graphics 25, 3, 2006, 8 pages.

Selim, Amed, et al., "Painting Style Transfer for Head Portraits Using Convolutional Neural Networks," ACM Transactions on Graphics 35, 4, 129, 18 pages.

Shen, X., et al., "Automatic Portrait Segmentation for Image Stylization," Computer Graphics Forum 35, 2, 2016, 10 pages.

Shih, Y.-C., et al, "Style transfer for headshot portraits," ACM Transactions on Graphics 33, 4, 148, 2014, 14 pages.

Simonyan, K., et al., "Very Deep Convolutional Networks for Large-Scale Image Recognition," CoRR abs/1409.1556, 2015, 14 pages.

Sinha, P., et al., "Face Recognition by Humans: Nineteen Results All Computer Vision Researchers Should Know About," Proceedings of the IEEE 94, 11, Nov. 2006, 15 pages.

Tresset, P., et al., "Generative portrait sketching," In Proceedings of International Conference on Virtual Systems and Multimedia, 2005, 10 pages.

Wang, X., et al., "Face Photo-Sketch Synthesis and Recognition," IEEE Transactions on Pattern Analysis and Machine Intelligence 31, 11, Nov. 2009, 13 pages.

Wang, Nannan, et al., "Transductive Face Sketch-Photo Synthesis," IEEE Transactions on Neural Networks and Learning Systems 24, 9, 1, Sep. 2013, 1 page.

Wang, et al., "Learnable Stroke Models for Example-Based Portrait Painting," In Proceedings of British Machine Vision Conference, 2013 11 pages.

Wang, Nannan, et al., "A Comprehensive Survey to Face Hallucination" International Journal of Computer Vision 106, 1, 24 pages.

Wexler, Y., et al., "Space-Time Completion of Video," IEEE Transactions on Pattern Analysis and Machine Intelligence 29, 3, Mar. 2007, 14 pages.

Winnemoller, Holger, et al. "Real-Time Video Abstraction," ACM Transactions on Graphics 25, 3, 2006, 6 pages.

Yang, M., et al., "Semantics-Driven Portrait Cartoon Stylization," In Proceedings of International Conference on Image Processing, Sep. 2010, 4 pages.

(56) References Cited

OTHER PUBLICATIONS

Yang, Y., et al., "Semantic Portrait Color Transfer With Internet Images," Multimedia Tools and Applications, 2017, 7 pages.
Zeng, K., et al., "From Image Parsing to Painterly Rendering," ACM Transactions on Graphics 29, 1, 2, 2009, 17 pages.
Zhang, Y., et al., "Data-Driven Face Cartoon Stylization," In SIG-GRAPH Asia Technical Briefs, 14, 2014, 4 pages.
Zhao, M., et al., "Portrait Painting Using Active Templates," In Proceedings of International Symposium on Non-Photorealistic Animation and Rendering, 2011, 7 pages.
Zhou, H., et al., "Markov Weight Fields for Face Sketch Synthesis," In Proceedings of IEEE Conference on Computer Vision and Pattern Recognition, 2012, 7 pages.

* cited by examiner

GENERATING A LAYERED ANIMATABLE PUPPET USING A CONTENT STREAM

CROSS-REFERENCE TO RELATED APPLICATIONS

This disclosure claims priority to U.S. Provisional Application No. 62/515,994, titled "Generating a Stylized Layered Image or Stylized Animation by Matching Semantic Features Via an Appearance Guide, a Segmentation Guide, and a Positional Guide" and filed Jun. 6, 2017, the entirety of which is hereby incorporated by reference herein.

TECHNICAL FIELD

This disclosure generally relates to computer animation or computer graphics and more specifically relates to generating a layered animatable puppet using a content stream.

BACKGROUND

Computer animation methods and techniques can involve using computer graphics systems to generate one or more characters (e.g., rigged puppets for character animation). In some instances, a user manually creates the character using a computer graphics system. To do so, the user may be required to manually create each individual component, feature, layer, etc. of the character. For instance, the user may be required to manually create the character's nose, mouth, eyes, etc. Moreover, some existing computer graphics systems may require the user to manually modify the character to create an animated puppet. For instance, the user may be required to manually adjust the character's mouth to form various shapes or gestures that resemble the animated puppet making a sound (e.g., a sound that is a phoneme or phone of a particular word). Manually creating an animated character or manually modifying the animated character to create an animated puppet can require expertise, may be time consuming, or can cause the user to create an undesirable (e.g. aesthetically unpleasing) animated character or puppet.

SUMMARY

Various embodiments of the present disclosure provide systems and methods for automatically generating a layered animatable puppet using a content stream.

In one example, a method for generating a layered animatable puppet includes identifying, by a processor, a plurality of frames of a content stream. The content stream includes a character performing a plurality of gestures usable for generating a layered puppet. The method further includes separating, by the processor, the plurality of frames of the content stream into a plurality of individual layers. The method also includes extracting, by the processor, a face of the character from the plurality of individual layers. The method further includes creating, by the processor, the layered puppet by combining the individual layers and using the face of the character. The method also includes outputting, by the processor, the layered puppet for animation to perform a gesture of the plurality of gestures.

Additional features and advantages of exemplary embodiments of the present disclosure will be set forth in the description which follows, and in part will be obvious from the description, or will be learned by the practice of such exemplary embodiments. The foregoing summary is not an extensive overview, and it is not intended to identify key elements or indicate a scope. Rather the foregoing summary identifies aspects of embodiments as a prelude to the detailed description presented below.

DETAILED DESCRIPTION

Figure 1:
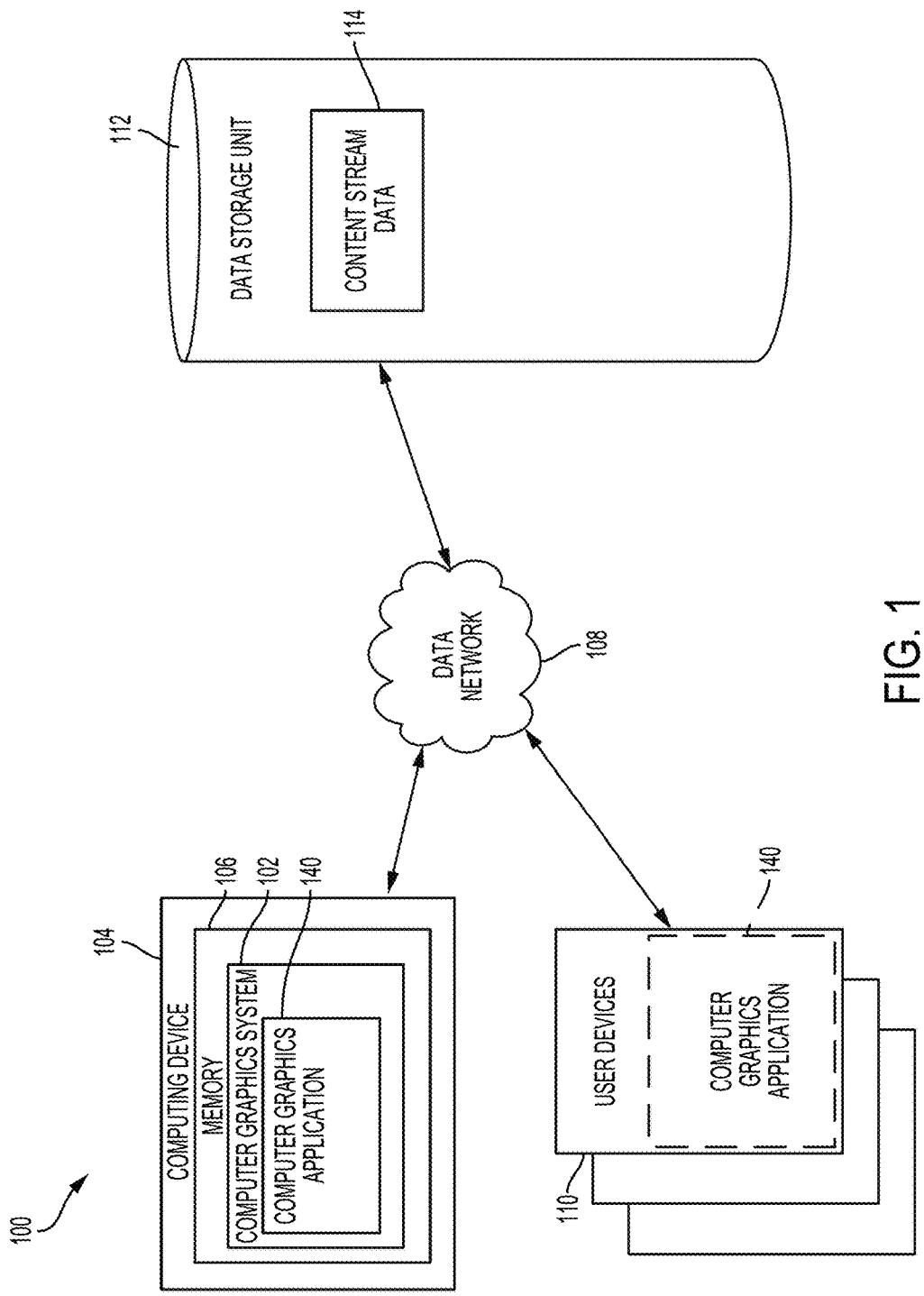
FIG. 1 is a block diagram of an exemplary environment in which a computer graphics system generates a layered animatable puppet using a content stream in accordance with one or more embodiments.

Embodiments described herein involve generating a layered animatable puppet using a content stream (e.g., a video stream). For example, a computer graphics device captures a video stream of a person performing various gestures and identifies the person's face or features of the person's face. The computer graphics device identifies the gestures in the video stream and the corresponding frames in the video stream in which the person is performing the gestures and separates the frames into individual layers or frames. The computer graphics device can augment each individual frame or layer by applying a particular artistic style to the frame, simulating various poses, views, or angles of the person's face in the frame, or caricaturizing the person's face in the frame. The computer graphics device can automatically generate a layered animatable puppet using the various individual frames or augmented frames by combining the individual frames in which the person is performing the various gestures to create a layered puppet. The computer graphics device can animate and output the layered puppet such that the layered augmented puppet makes or performs gestures that resemble the gestures made by the person in the video stream.

For instance, the computer graphics device receives a video stream from another device (e.g., a camera) and the video stream includes a person. The computer graphics device identifies or extracts the person's face by identifying various features of the person's face. In this example, the video stream includes one or more images or frames of the person performing various gestures that can be used to generate an animatable puppet. As an example, in a frame of the video stream, the person is smiling and in another frame the person is frowning. The computer graphics device can identify various gestures in the video stream and the corresponding image or frame in which the character is performing the gestures. As another example, the computer graphics device identifies various gestures and the corresponding image or frame by analyzing audio associated with the video stream. In this example, the computer graphics device analyzes the audio and determines or identifies a frame or image that is aligned with a sound, phoneme, or phone that the character is making. For example, the image or frame could depict the character making a gesture resembling a viseme that corresponds to a particular phoneme or phone. In some examples, the computer graphics device separates each identified frame or image into an individual layer.

In some examples, the computer graphics device can perform one or more augmentation operations on each individual layer to generate an augmented layer. As an example, the computer graphics device applies a style or texture to each layer to create various stylized layers. Continuing with this example, the computer graphics device can automatically generate a layered animatable puppet using the various individual layers or using the augmented layers. For example, the computer graphics device combines the identified layers in which the character is performing the identified gestures to create a layered puppet. The computer graphics device can combine the various layers or augmented layers to generate a layered puppet and the generated layered puppet can be animated to perform gestures that resemble the various gestures performed by the person in the video stream. As an example, the computer graphics device generates a layered puppet and outputs the layered puppet such that the layered puppet makes or performs the smiling gesture or the frowning gesture similar to the smiling or frowning gestures performed by the person in the video stream.

As used herein, the term "character" is used to refer to any person or creature.

As used herein, the term "frame" is used to refer to any image that is a portion of a video.

As used herein, the term "layer" or is used to refer to any identified individual frame or image of a video that is separated from other images or frames of the video.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

FIG. 1 is a block diagram of an exemplary environment 100 in which a computer graphics system 102 generates a layered animatable puppet using a content stream in accordance with one or more embodiments. The environment 100 includes the computer graphics system 102, one or more computing devices 104, and one or more data storage units 112. The computer graphics system 102, the computing devices 104, and the data storage unit 112 are communicatively coupled via one or more data networks 108 (e.g., the Internet, one or more local area networks ("LAN"), one or wired area networks, or some combination thereof).

In some embodiments, a user of the computing device 104 visits a webpage or an application store to explore applications supported by the computer graphics system 102. The computer graphics system 102 provides the applications as a software as a service ("SaaS"), or as a standalone application that may be installed on the computing device 104, or as a combination.

In some embodiments, the computing device 104 represents various types of client devices. For example, the computing device 104 is a mobile device (e.g., a mobile telephone, a smartphone, a PDA, a tablet, a laptop, a camera, a tracker, a watch, a wearable device, etc.). The computing device 104, however, in some embodiments, is a non-mobile device (e.g., a desktop computer or another type of client device). In this example, the computer graphics system 102 is implemented on, executed by, or stored on one or more computing devices 104. For example, the computer graphics system 102 is stored on a memory device 106 of the computing device 104. In some embodiments, the computer graphics system 102 is executed on the one or more computing devices 104 via a computer graphics application 140.

In some embodiments, the user devices 110 can be any type of client device and may include a computer graphics application 140. In this example, one or more components of the computer graphics system 102 may be stored on, implemented on, or executed by the user devices 110.

The data storage unit 112 stores content stream data 114 that includes one or more content streams. A content stream can be any sequence or stream of images or frames such as, for example, a video stream. In some examples, the content stream data 114 includes audio data associated with the content stream. The audio data or file can indicate one or more sounds or phones in each of the various images or frames of the content stream. The content stream data 114 can be obtained from the computing device 104, the user device 110, or any other source. As an example, the computing device 104 or the user device 110 may include a camera or other device configured to capture one or more images of a user of the computing device 104 or the user device 110. In some embodiments, the computing device 104 or the user device 110 can be communicatively coupled to the data storage unit 112 via one or more data networks 108 and the data storage unit 112 receives or obtains a content stream, an image, or one or more frames from the user device 110 or the computing device 104. In some embodiments, the computing device 104 is communicatively coupled to the data storage unit 112 and the computing device 104 receives or obtains content stream data 114 from the data storage unit 112 via the data network 108 or a direct connection. In another embodiment, the computing device 104 includes the data storage unit 112 and can access the content stream data 114. In still another embodiment, the computing device 104 is communicatively coupled to the user device 110 and receives or obtains content stream data 114 from the user device 110.

In some embodiments, the computer graphics system 102 includes the computer graphics application 140, which can include one or more instructions stored on a computer-readable storage medium and executable by one or more processors of one or more computing devices (e.g., a processor of the computer graphics system 102, the user device 110, or any other device). When executed by the one or more processors, the computer-executable instructions of the computer graphics application 140 cause the computer graphics system 102 to generate a layered animatable puppet using a content stream.

For example, the computer graphics application 140 causes the computer graphics system 102 to obtain or receive content stream data 114 from the data storage unit 112, the user device 110, or any other source. The content stream data 114 includes data indicating a content stream such as, for example, a video stream. In some examples, one or more images or frames of the content stream include a character such as, for example, a user of the computing device 104 or the user device 110. In some embodiments, the computer graphics application 140 causes the computer graphics system 102 to obtain or receive audio data associated with the content stream from the data storage unit 112, the user device 110, or any other source. The audio data or file can indicate one or more sounds or phones in each of the various images or frames of the content stream such as, for example, a sound made by the character in the frame or image.

In some embodiments, the computer graphics application 140 causes the computer graphics system 102 to identify or extract a face of the character in the video stream. For example, the computer graphics application 140 causes the computer graphics system 102 to identify or extract the character's face by identifying various regions or features of the character's face. In some embodiments, the content stream obtained or received by the computer graphics system 102 includes one or more frames in which the character is performing various gestures that can be used to generate an animatable puppet. As an example, in a frame, the character is making a gesture with the character's mouth that resembles a viseme for a sound, phoneme, phone, etc. For instance, in a frame of the content stream, the character is making a gesture that resembles the character saying the "H" sound (e.g., a frame from a set of the frames that, as a group, depict a character saying the word "Hello"). As another example, in a frame of the video stream, the character is making a smiling or frowning gesture.

The computer graphics application 140 can cause the computer graphics system 102 to identify the various gestures in the content stream and the corresponding frames in which the character is performing the gestures. In some examples, the computer graphics application 140 causes the computer graphics system 102 to automatically identify a gesture and the corresponding image or frame. For example, the computer graphics system 102 analyzes the face or feature of the character in a frame of the content stream and determines, identifies, or detects a gesture performed by the character in the frame based on the character's face or feature. In this example, the computer graphics system 102 identifies the corresponding frame or image in which the character is performing the gesture. As another example, the computer graphics system 102 identifies gestures in the content stream and the corresponding frame by analyzing audio data associated with the content stream and determining a sound, phoneme, phone, etc. that the character is making or saying in a particular image or frame. In this example, the computer graphics system 102 identifies the corresponding image or frame in which the character is making or saying the sound, phoneme, phone, etc. As an example, the computer graphics system 102 analyzes the audio data and determines or identifies a frame of the content stream that is aligned with a phoneme or phone of the word "Hello" such as, for example, a frame aligned with the "L" sound. As still another example, the computer graphics system 102 receives or obtains the content stream from a camera of the computing device 104 or the user device 110 (e.g., in real-time) and the computer graphics application 140 causes the computer graphics system 102 to output a request to a user of the computing device 104 or the user device 110 to perform a particular gesture. In this example, the computer graphics system 102 analyzes the content stream and compares one or more gestures performed by the user to the particular gesture to determine whether a gesture performed by the user corresponds to the particular gesture. In this example, in response to determining that a gesture performed by the user corresponds to the particular gesture, the computer graphics system 102 identifies a frame of the content stream in which the user performs the gesture. In still another example, the computer graphics system 102 receives or obtains the video stream from the camera of the computing device 104 or the user device 110 (e.g., in real-time) and user input indicating a frame in which the user of the computing device 104 or the user device 110 is performing a particular gesture. For instance, the computer graphics system 102 receives a video stream from the camera and the user is performing a gesture that resembles the user saying a sound for the letter "C." The computer graphics system 102 also receives user input indicating the frame in which the user is performing the gesture (e.g., by user input to capture the particular frame).

In some embodiments, the computer graphics application 140 causes the computer graphics system 102 to separate each identified frame in which the character is performing a gesture into an individual layer. For example, the computer graphics application 140 causes the computer graphics system 102 to identify each frame in which the character is performing one or more gestures that resemble the character saying the sounds of the letters "H," "E," "L," "L," and "O." The computer graphics application 140 separates each frame into an individual layer.

The computer graphics application 140 can cause the computer graphics system 102 to perform one or more augmentation operations on each individual layer to generate an augmented layer. For example, the computer graphics system 102 receives user input indicating a particular artistic style or texture to be applied to one or more layers. The computer graphics application 140 causes the computer graphics system 102 to apply the style or texture to the layer to create a stylized layer. As another example, the computer graphics system 102 receives user input indicating a command to simulate or synthesize a three-dimensional model of an individual layer. The computer graphics application 140 causes the computer graphics system 102 to generate one or more augmented layers by simulating or synthesizing various poses, views, or angles of the character in the individual layer. As still another example, the computer graphics system 102 receives user input to caricaturize one or more of the layers. The computer graphics application 140 causes the computer graphics system to generate one or more augmented layers by warping, distorting, or otherwise modifying the one or more layers. In some examples, the computer graphics system 102 can perform one or more augmentation operations in combination or individually on each individual layer to generate an augmented layer.

In some embodiments, the computer graphics application 140 causes the computer graphics system 102 to automatically generate a layered puppet using one or more layers. For example, the computer graphics application 140 causes the computer graphics system 102 to combine the layers in which the character is performing one or more identified gestures to generate a layered puppet (e.g., combine the layers in which the character is performing one or more gestures that resembles the character saying the sounds of the letters "H," "E," "L," "L," and "O"). In another embodiment, the computer graphics application 140 causes the computer graphics system 102 to automatically generate a layered puppet using one or more of the augmented layers. For example, the computer graphics application 140 causes the computer graphics system 102 to augment the layers in which the character is performing one or more identified gestures and combine the augmented layers to generate an layered augmented puppet.

In this example, the computer graphics application 140 causes the computer graphics system 102 to combine the various layers or the augmented layers to automatically generate a layered puppet that can be animated to perform gestures that resemble the various gestures performed by the character in the content stream. As an example, the computer graphics system 102 identifies a frame in the content stream in which the character is performing a gesture that resemble the character saying the sound of a letter from the word "Hello" (i.e., the "H" sound, the "L" sound, etc.). The computer graphics system 102 separates each frame into an individual layer. The computer graphics system 102 can augment (e.g., stylize) each identified layer to generate one or more augmented layers and combine the augmented layers together to generate a layered augmented puppet. The computer graphics system 102 can animate the layered augmented puppet and output the layered augmented puppet via a user interface such that the layered augmented puppet makes or performs one or more gestures that can be perceived as the animated puppet saying the sounds from the individual letters "H," "E," "L," "L," and "O" of the word "Hello." Thus, in this manner, the computer graphics system 102 can automatically generate a layered animated puppet using a content stream.

While, in some examples, the computer graphics system 102 is described as performing one or more augmentation operations on a layer to generate an augmented layer, the present disclosure is not limited to such configurations. Rather, in some embodiments, the computer graphics system 102 may not perform an augmentation operation on a layer.

Although the exemplary environment 100 of FIG. 1 is depicted as having a certain number of components, in other embodiments, the exemplary environment 100 has any number of additional or alternative components. Further, while FIG. 1 illustrates a particular arrangement of the computer graphics system 102, user devices 110, and the data storage unit 112, various additional arrangements are possible. As an example, while FIG. 1 illustrates data storage unit 112 and the computer graphics system 102 as part of separate systems, in some embodiments, the data storage unit 112 and the computer graphics system 102 are part of a single system.

Figure 2:
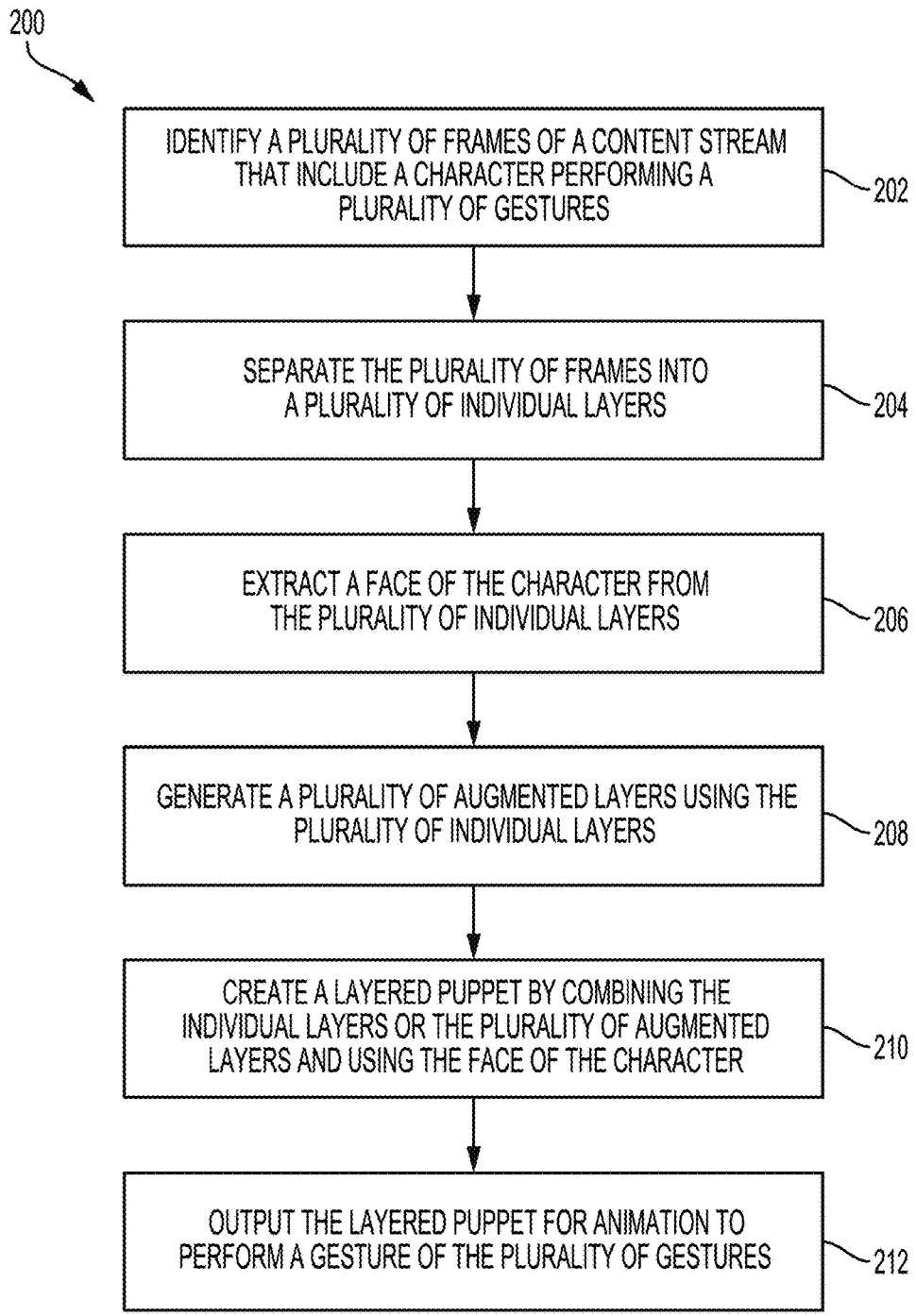
FIG. 2 is a flow chart depicting an example of a process for generating a layered animatable puppet using a content stream in accordance with one or more embodiments.

FIG. 2 is a flow chart depicting an example of a process 200 for generating a layered animatable puppet using a content stream in accordance with one or more embodiments. In some embodiments, one or more processing devices such as, for example, the computing system described herein with respect to FIG. 3, implement operations depicted in FIG. 2 by executing suitable program code (e.g., the computer graphics system 102 of FIG. 1) that implements one or more algorithms encompassed by the process 200. For illustrative purposes, the process 200 is described with reference to the examples depicted in FIG. 1, but other implementations are possible.

In block 202, various frames of a content stream that include a character performing various gestures are identified.

In some embodiments, a computer graphics system 102 is implemented on, executed by, or stored on one or more computing devices 104. In some embodiments, the computing device 104 is communicatively or electronically coupled to a data storage unit 112 that stores the content stream as content stream data 114. The content stream data 114 includes data indicating the content stream such as, for example, a video stream. In some examples, the content stream includes one or more frames that include a character such as, for example, a user of the computing device 104 or the user device 110. In some embodiments, the content stream data 114 includes audio data that indicates one or more sounds or phones associated with each of the various frames (e.g., a sound made by the character in the frame).

In some embodiments, the computer graphics system 102 includes a computer graphics application 140, which can include one or more instructions stored on a computer-readable storage medium and executable by one or more processors of one or more computing devices (e.g., a processor of the computer graphics system 102, the user device 110, or any other device). When executed by the one or more processors, the computer-executable instructions of the computer graphics application 140 can cause the computer graphics system 102 to receive or obtain the content stream data 114 from the data storage unit 112 via a data network 108. In another embodiment, the computing device 104 includes the data storage unit 112 and the computer graphics system 102 can access the content stream data 114. In another embodiment, the computer-executable instructions of the computer graphics application 140 can cause the computer graphics system 102 to receive or obtain the data indicating a content stream from the computing device 104, the user device 110, or any other source. As an example, the computing device 104 or the user device 110 may include a camera or other device configured to capture one or more content streams such as, for example, images or frames that include the user of the computing device 104 or the user device 110. In some embodiments, the computing device 104 or the user device 110 can be communicatively coupled to the data storage unit 112 via one or more data networks 108 and the data storage unit 112 receives or obtains a content stream, image, or frame the user device 110 or the computing device 104. In some embodiments, the computing device 104 is communicatively coupled to the data storage unit 112 and the computing device 104 receives or obtains content stream data 114 from the data storage unit 112 via the data network 108 or a direct connection. In some embodiments, the computing device 104 is communicatively coupled to the user device 110 and the computing device 104 receives or obtains data indicating the content stream from the user device 110 via the data network 108 or a direct connection.

Figure 3:
FIG. 3 is an image depicting an example of a frame of a content stream in which a character performing a gesture that can be used to generate a layered animatable puppet in accordance with one or more embodiments.

The content stream obtained or received by the computer graphics system 102 can include one or more frames in which the character is performing various gestures that can be used to generate an animatable puppet. As an example, in a frame of the content stream, the character is making a smiling or frowning gesture. As another example, in a frame of the content stream, the character is making a gesture that resembles the character making a sound (e.g., a phoneme or phone of a word). For example, in FIG. 3 is an image depicting an example of a frame of a content stream in which a character performing a gesture that can be used to generate an animatable puppet. In the example depicted in FIG. 3, the character is performing a neutral expression gesture that can be used to generate an animated puppet that can make a corresponding neutral expression gesture.

Figure 4:
FIG. 4 is an image depicting another example of a frame of a content stream in which a character performing a gesture that can be used to generate a layered animatable puppet in accordance with one or more embodiments.
Figure 5:
FIG. 5 is an image depicting another example of a frame of a content stream in which a character performing a gesture that can be used to generate a layered animatable puppet in accordance with one or more embodiments.
Figure 6:
FIG. 6 is an image depicting another example of a frame of a content stream in which a character performing a gesture that can be used to generate a layered animatable puppet in accordance with one or more embodiments.
Figure 7:
FIG. 7 is an image depicting another example of a frame of a content stream in which a character performing a gesture that can be used to generate a layered animatable puppet in accordance with one or more embodiments.
Figure 8:
FIG. 8 is an image depicting another example of a frame of a content stream in which a character performing a gesture that can be used to generate a layered animatable puppet in accordance with one or more embodiments.
Figure 9:
FIG. 9 is an image depicting another example of a frame of a content stream in which a character performing a gesture that can be used to generate a layered animatable puppet in accordance with one or more embodiments.
Figure 10:
FIG. 10 is an image depicting another example of a frame of a content stream in which a character performing a gesture that can be used to generate a layered animatable puppet in accordance with one or more embodiments.
Figure 11:
FIG. 11 is an image depicting another example of a frame of a content stream in which a character performing a gesture that can be used to generate a layered animatable puppet in accordance with one or more embodiments.
Figure 12:
FIG. 12 is an image depicting another example of a frame of a content stream in which a character performing a gesture that can be used to generate a layered animatable puppet in accordance with one or more embodiments.
Figure 13:
FIG. 13 is an image depicting another example of a frame of a content stream in which a character performing a gesture that can be used to generate a layered animatable puppet in accordance with one or more embodiments.
Figure 14:
FIG. 14 is an image depicting another example of a frame of a content stream in which a character performing a gesture that can be used to generate a layered animatable puppet in accordance with one or more embodiments.
Figure 15:
FIG. 15 is an image depicting another example of a frame of a content stream in which a character performing a gesture that can be used to generate a layered animatable puppet in accordance with one or more embodiments.
Figure 16:
FIG. 16 is an image depicting another example of a character performing a gesture that can be used to generate a layered animatable puppet in accordance with one or more embodiments.
Figure 17:
FIG. 17 is an image depicting another example of a frame of a content stream in which a character performing a gesture that can be used to generate a layered animatable puppet in accordance with one or more embodiments.

FIG. 4 is an image depicting another example of a frame of a content stream in which a character performing a gesture that can be used to generate a layered animatable puppet. In the example depicted in FIG. 4, the character is performing a closed eyes gesture that can be used to generate an animated puppet that can make a corresponding closed eyes gesture. FIG. 5 is an image depicting another example of a frame of a content stream in which a character performing a gesture that can be used to generate a layered animatable puppet. In the example depicted in FIG. 5, the character is performing a smiling gesture that can be used to generate an animated puppet that can make a corresponding smiling gesture. FIG. 6 is an image depicting another example of a frame of a content stream in which a character performing a gesture that can be used to generate a layered animatable puppet. In the example depicted in FIG. 6, the character is performing a surprised expression gesture that can be used to generate an animated puppet that can make a corresponding surprised expression gesture. FIG. 7 is an image depicting another example of a frame of a content stream in which a character performing a gesture that can be used to generate a layered animatable puppet. In the example depicted in FIG. 7, the character is performing a gesture that resembles the character saying the sound of the letter "A" in the word "Cat." The gesture is used to generate an animated puppet that can make a corresponding gesture. FIGS. 8-17 are each an image depicting another example of a frame of a content stream in which a character performing a gesture that can be used to generate a layered animatable puppet.

Returning to FIG. 2, in block 202, the computer graphics application 140 can cause the computer graphics system 102 to identify the various gestures in the content stream and the corresponding image in which the character is performing the identified gestures (e.g., identify the various gestures in FIGS. 3-17 and the corresponding frames).

In some examples, the computer graphics application 140 causes the computer graphics system 102 to automatically identify or detect the gestures and the corresponding image or frame. For example, the computer graphics system 102 analyzes a feature of the character (e.g., the face or other feature of the character) in each frame of the content stream and determines, identifies, or detects a gesture performed by the character in each frame based on the feature of the character. For instance, the computer graphics system 102 analyzes the character's mouth in a frame, determines that the character is performing a smiling gesture based on the character's mouth, and identifies the frame in which the character is performing the smiling gesture. In another example, the computer graphics system 102 receives or obtains the content stream from a camera of the computing device 104 or the user device 110 (e.g., in real-time) and the computer graphics application 140 causes the computer graphics system 102 to output a request to a user of the computing device 104 or the user device 110 to perform a particular gesture. In this example, the computer graphics system 102 analyzes the content stream and compares a gesture performed by the character in one or more frames to the particular gesture to determine if the corresponds to the particular gesture. The computer graphics system 102 identifies a frame of the video stream in which the user performs the particular gesture in response to determining that a gesture performed by the user corresponds to the particular gesture. As an example, the computer graphics system 102 outputs data to the user to perform a smiling gesture. The computer graphics system 102 analyzes the received content stream to determine if a gesture performed by the user in a frame of the content stream corresponds to a smiling gesture and identifies the particular frame in which the user performs the smiling gesture in response to determining that a gesture performed by the user corresponds to the smiling gesture.

In some embodiments, the computer graphics application 140 causes the computer graphics system 102 to identify gestures in the content stream and the corresponding frame by analyzing audio data associated with the content stream (e.g., audio data obtained or received in block 202). As an example, the computer graphics system 102 analyzes the audio data and determines or identifies a frame of the content stream that is aligned with each phoneme or phone of the word "Hello" such as, for example, a frame aligned with the "L" sound.

In some embodiments, the computer graphics system 102 receives or obtains the content stream from a camera device of the computing device 104 or the user device 110 and user input indicating a frame in which the user of the computing device 104 or the user device 110 is performing a particular gesture. For instance, the computer graphics system 102 receives a video stream from the camera device and the user is performing a frowning gesture and the user provides user input indicating the frame of the content stream in which the user is performing the frowning gesture (e.g., by providing user input to capture the particular frame).

In block 204, the various frames (e.g., the frames or images identified in block 202) are separated into various individual layers. In some embodiments, the computer graphics application 140 causes the computer graphics system 102 to separate the various frames into various individual layers. For example, the computer graphics application 140 causes the computer graphics system 102 to identify a first frame in which the character is making a smiling gesture and a second frame in which the character is making a frowning gesture and separates each frame into an individual layer.

In block 206, a face of the character is extracted from the various individual layers. In some embodiments, the computer graphics application 140 causes the computer graphics system 102 to extract or identify the face of the character from the various individual layers.

Figure 18:
FIG. 18 is an image depicting an example of identified features of a character that can be used to generate a layered animatable puppet in accordance with one or more embodiments.

For example, the computer graphics application 140 causes the computer graphics system 102 to identify or extract the character's face by identifying various regions or features of the character's face. In some examples, the computer graphics application 140 causes the computer graphics system 102 to identify a location or position of the various regions or features of the character's face. As an example, the computer graphics system 102 identifies the character's features including, for example, the character's eyes, mouth, nose, eyebrow, lips, oral cavity, skin, ears, chin, etc., and a corresponding location or position of the character's identified features. For example, FIG. 18 is an image depicting an example of identified features of a character that can be used to generate a layered animatable puppet in accordance with one or more embodiments. In the example depicted in FIG. 18, the computer graphics application 140 causes the computer graphics system 102 to identify the character's eyebrows, lips, nose, eyes, chin, jaw line, etc.

Figure 19:
FIG. 19 is an image depicting an example of a mask of one or more features of a character that can be generated or created for generating a layered animatable puppet in accordance with one or more embodiments.

Returning to FIG. 2, in some embodiments, in block 206, the computer graphics application 140 causes the computer graphics system 102 to identify or extract one or more features of the character by creating a mask or soft mask of the one or more features of the character and identifying the one or more features based on the mask or the soft mask. As an example, the computer graphics system 102 creates a head soft mask of the character to identify or extract the character's head. In some examples, creating a mask can involve applying a mask to a layer of an image or frame that includes a feature of the character and controlling a transparency of the mask. In some examples, controlling the transparency of the mask can create, indicate or reveal a boundary or portion (e.g., a visible boundary or portion) of the feature or layer of the image. For example, FIG. 19 is an image depicting an example of a mask of one or more features of a character that can be generated or created for generating a layered animatable puppet in accordance with one or more embodiments. In the example depicted in FIG. 19, the computer graphics application 140 causes the computer graphics system 102 to create a face or head soft mask of the character to identify or extract the character's head or face.

Returning to FIG. 2, in block 208, various augmented layers are generated using the individual layers (e.g., the individual layers created in block 204). In some embodiments, the computer graphics application 140 causes the computer graphics system 102 to perform one or more augmentation operations on an individual layer to generate an augmented layer.

Figure 20:
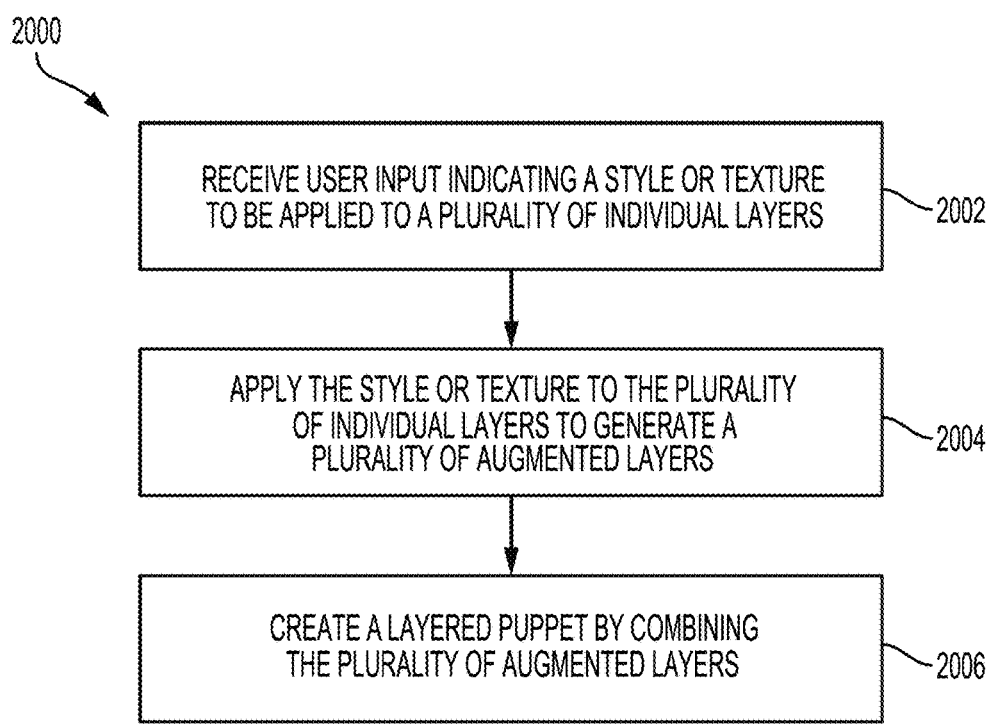
FIG. 20 is a flow chart depicting an example of a process for generating various augmented layers using various individual layers in accordance with one or more embodiments.

For example, FIG. 20 is a flow chart depicting an example of a process 200 for generating various augmented layers using various individual layers in accordance with one or more embodiments.

In block 2002, user input indicating a style or texture to be applied to various individual layers to stylize the individual layers is received (e.g., the individual layers created in block 204 of FIG. 2). In some embodiments, the computer graphics application 140 causes the computer graphics system 102 to receive the user input indicating a command to apply a particular artistic style or texture to each individual layer (e.g., the layer in which the character is making a smiling gesture and the layer in which the character is making a frowning gesture).

Figure 21:
FIG. 21 is an image depicting various augmented or stylized layers using various individual layers in accordance with one or more embodiments.
Figure 21:
Figure 21:
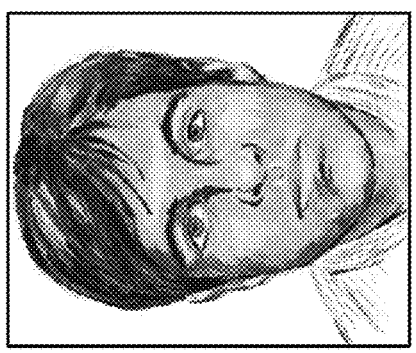
Figure 21:
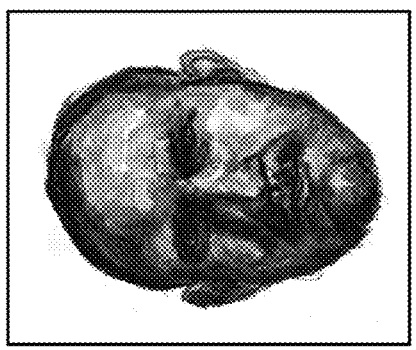

In block 2004, the style or texture is applied to the various individual layers to generate various augmented layers. In some embodiments, the computer graphics application 140 causes the computer graphics system 102 to apply the style or texture to each individual layer to generate various stylized layers. As an example, the computer graphics system 102 receives user input indicating a command to apply a watercolor style or texture to a first layer in which the character is making a smiling gesture and a second layer in which the character is making a frowning gesture (e.g., in block 2002) and the computer graphics system 102 generates a first stylized layer that includes the character making the smiling gesture and depicted as a watercolor drawing and a second stylized layer that includes the character making the frowning gesture and depicted as a watercolor drawing. In this example, the first and second stylized layers can represent augmented layers. In some examples, the computer graphics application 140 causes the computer graphics system 102 to stylize one or more layers using various techniques or methods. An example of an algorithm that can be used by the computer graphics system 102 to stylize one or more layers, frames, or images is described in U.S. patent application Ser. No. 15/784,415, filed Oct. 16, 2017, and entitled "Generating a Stylized Image or Stylized Animation by Matching Semantic Features Via an Appearance Guide, a Segmentation Guide, and a Positional Guide," the entirety of which is incorporated by reference herein. For example, FIG. 21 is an image depicting various augmented or stylized layers using various individual layers in accordance with one or more embodiments.

Returning to FIG. 20, in block 2006, a layered puppet is created by combining the various augmented layers. In some examples and as described in further detail below with respect to FIG. 2, the computer graphics application 140 can cause the computer graphics system 102 to create the layered puppet by combining the various augmented or stylized layers.

Figure 22:
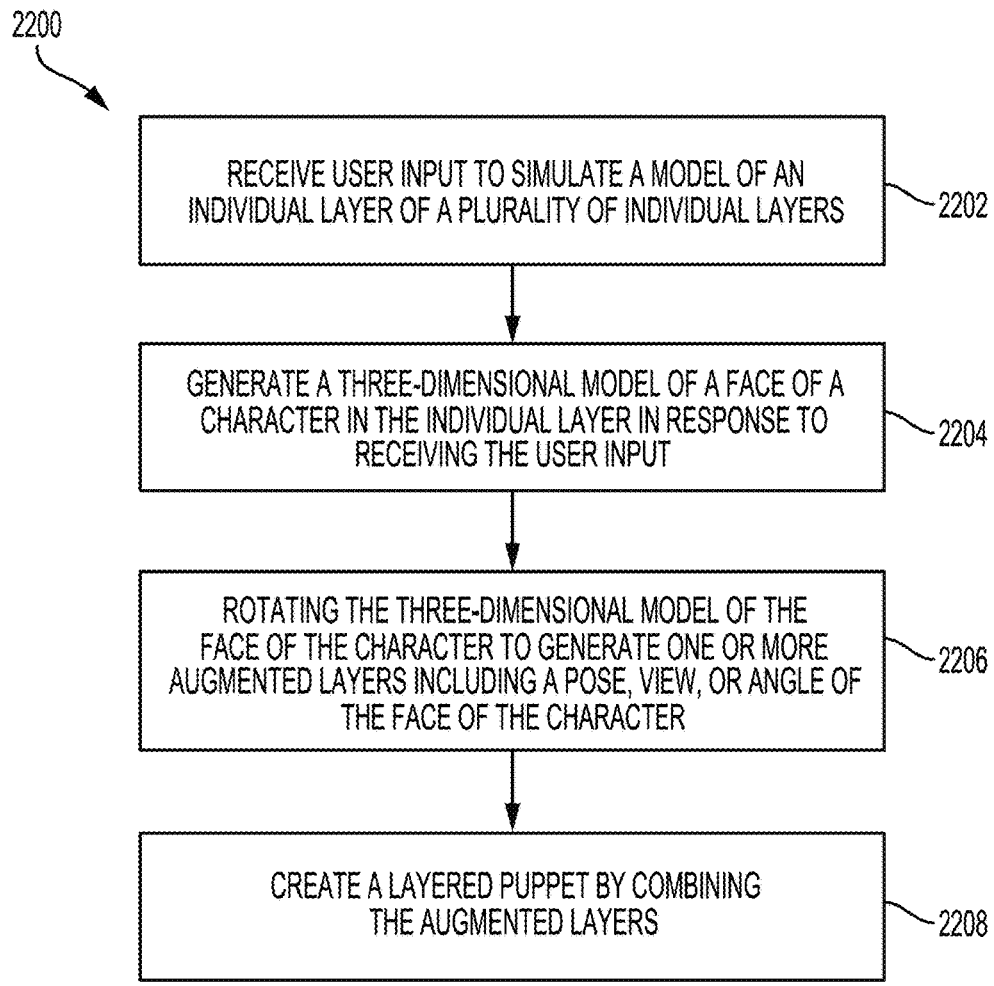
FIG. 22 is a flow chart depicting another example of a process for generating various augmented layers using various individual layers in accordance with one or more embodiments.

FIG. 22 is a flow chart depicting another example of a process 2200 for generating various augmented layers using various individual layers in accordance with one or more embodiments.

In block 2202, user input indicating a command to simulate or synthesize a model of an individual layer of a plurality of individual layers is received (e.g., the individual layers created in block 204 of FIG. 2). In some embodiments, the computer graphics application 140 causes the computer graphics system 102 to receive the user input indicating a command to simulate or synthesize a model (e.g., a three-dimensional model) of a layer of the plurality of individual layers (e.g., the layer in which the character is making a smiling gesture).

In block 2204, a three-dimensional model of a face of a character in the individual layer is generated in response to receiving the user input (e.g., in block 2202). In some embodiments, the computer graphics application 140 causes the computer graphics system 102 to generate the three-dimensional model of the face of the character in the individual model.

In block 2206, the three-dimensional model of the face of the character is rotated to generate one or more augmented layers including a pose, view, or angle of the face of the character in response to receiving the user input. In some embodiments, the computer graphics application 140 causes the computer graphics system 102 to rotate the three-dimensional model of the face of the character to generate the various augmented layers.

For example, the computer graphics system 102 receives user input indicating a command to simulate or synthesize a three-dimensional model of an individual layer (e.g., in block 2202) and the computer graphics system 102 generates one or more augmented layers by simulating or synthesizing various poses, views, angles, etc. of the character in the individual layer. For instance, a layer includes an image of the character facing forward and the computer graphics system 102 simulates or generates an augmented layer that includes an image of the character turned to right. In some examples, the computer graphics application 140 causes the computer graphics system 102 to simulate or synthesize various poses, views, angles, etc. of the character using various methods or techniques. As an example, the computer graphics system 102 generates the various poses, views, angles, etc. of the character by determining or generating a three-dimensional model of the character's face, detecting one or more textures of the character's face, and rotating the three-dimensional model to generate one or more poses, views, angles, etc. of the character. In this example, one or more of the augmented layers can include one or more of the generated views, poses, angles, etc. of the character's face.

In block 2208, a layered puppet is created by combining the various augmented layers. In some examples and as described in further detail below with respect to FIG. 2, the computer graphics application 140 can cause the computer graphics system 102 to create the layered puppet by combining the various augmented layers.

Figure 23:
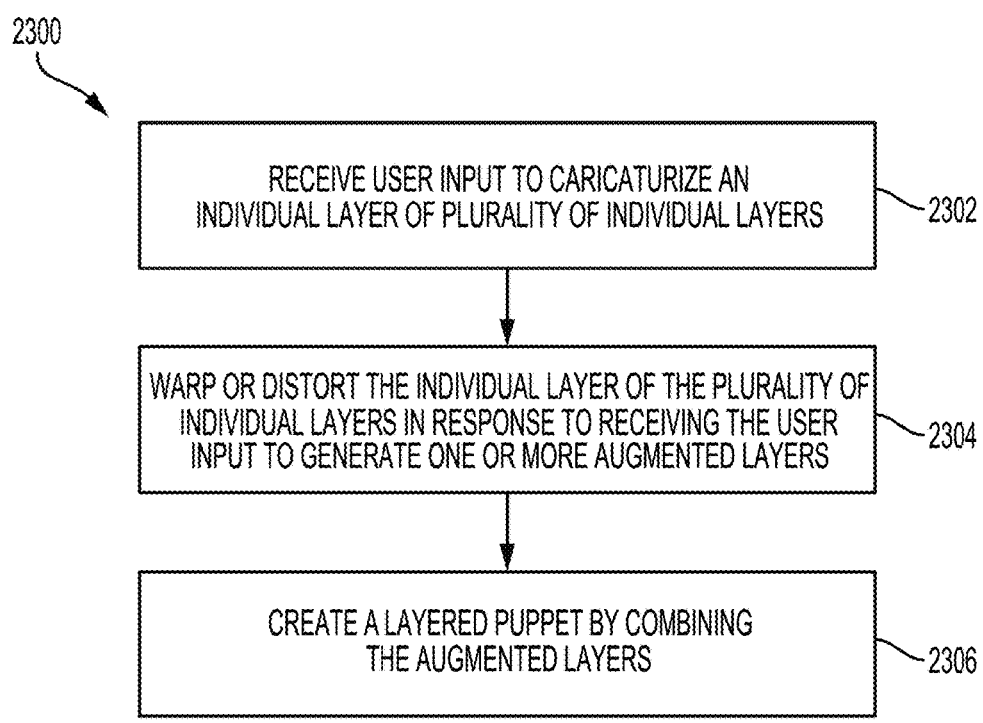
FIG. 23 is a flow chart depicting another example of a process for generating various augmented layers using various individual layers in accordance with one or more embodiments.

FIG. 23 is a flow chart depicting another example of a process 2300 for generating various augmented layers using various individual layers in accordance with one or more embodiments.

In block 2302, user input indicating a command to caricaturize one or more individual layers of a plurality of individual layers is received (e.g., the individual layers created in block 204 of FIG. 2). In some embodiments, the computer graphics application 140 causes the computer graphics system 102 to receive the user input indicating the command to caricaturize an individual layer of the plurality of individual layers.

In block 2304, the individual layer is warped or distorted in response to receiving the user input to generate one or more augmented layers. In some embodiments, the computer graphics application 140 causes the computer graphics system 102 to warp, distort, or otherwise modify the individual layer to generate the various augmented layers.

For example, a layer includes an image of the character and the computer graphics system 102 receives user input to caricaturize the layer. In this example, the computer graphics system 102 generates an augmented layer by automatically caricaturizing the character by warping or distorting a feature of the character (e.g., warping or distorting the character's eyes, nose, etc.) in response to receiving a command to caricaturize the layer. In some examples, the computer graphics application 140 causes the computer graphics system 102 to caricaturize one or more layers using various methods or techniques. As an example, the computer graphics system 102 analyzes a layer and identifies one or more features of the character in the layer. The computer graphics system 102 determines a characteristic of the one or more features and modifies the one or more features based on the characteristic. For instance, the computer graphics system 102 identifies the eyes of the character in a layer and analyzes the character's eyes to determine a distance between the character's eyes or a shape of the character's eyes. In this example, the computer graphics system 102 can generate an augmented layer in response to receiving user input indicating a command to caricaturize the layer by warping or distorting the distance between the character's eyes or the shape of the character's eyes.

In block 2306, a layered puppet is created by combining the various augmented layers. In some examples and as described in further detail below with respect to FIG. 2, the computer graphics application 140 can cause the computer graphics system 102 to create the layered puppet by combining the various augmented layers.

Returning to FIG. 2, in block 210, a layered puppet is created by combining the individual layers (e.g., the individual layers created in block 204) or the various augmented layers (e.g., the augmented layers generated in block 208) and using the face of the character (e.g., the face of the character extracted in block 206). In some embodiments, the computer graphics application 140 causes the computer graphics system 102 to create the layered puppet by combining the individual layers or the various augmented layers and using the face of the character.

For example, the computer graphics application 140 causes the computer graphics system 102 to automatically generate a layered puppet by combining a first layer in which the character is making a smiling gesture and a second layer in which the character is making a frowning gesture. As another example, the computer graphics application 140 causes the computer graphics system 102 to automatically generate a layered puppet by combining a first augmented layer in in which the character is making a smiling gesture and a second augmented layer in which the character is making a frowning gesture.

In block 212, the layered puppet is output for animation to perform a gesture of the various gestures. In some embodiments, the computer graphics application 140 causes the computer graphic system 102 to generate one or more user interfaces for outputting the layered puppet. In another embodiment, the computer graphics application 140 causes the computer graphic system 102 to output the layered puppet for storage (e.g., in a database)

In some embodiments, outputting the layered puppet can involve animating the layered puppet and outputting the animated layered puppet via a user interface. In this example, the computer graphics application 140 causes the computer graphics system 102 to combine the various individual layers (e.g., the individual layers created in block 208) or the various augmented layers (e.g., the augmented layers generated in block 210) to automatically generate a layered puppet that can be animated to perform gestures that resemble the various gestures performed by the character in the content stream. As an example, the computer graphics system 102 identifies a first frame in the content stream in which the character is performing a smiling gesture and a second frame in which the character is performing a frowning gesture and separates each frame into a first layer and second layer. The computer graphics system 102 can augment (e.g., stylize) the first and second layers to generate a first augmented layer and a second augmented layer and combine the first and second augmented layers to generate a layered augmented puppet. The computer graphics system 102 can animate the layered augmented puppet and output the layered augmented puppet such that the layered augmented puppet performs one or more gestures that can be perceived as the animated puppet frowning or smiling.

As another example, the computer graphics system 102 analyzes audio data associated with the content stream and determines a sound, phoneme, phone, etc. that the character is making or saying in a particular image or frame (e.g., in block 202). As an example, the computer graphics system 102 analyzes the audio data and determines or identifies a frame of the content stream that is aligned with each phoneme or phone of the word "Hello" such as, for example, a frame aligned with the "L" sound. In this example, the computer graphics system 102 can separate the identified frame into an individual layer and augment the layer in substantially the same manner as described above (e.g., stylize the layer). Continuing with this example, the computer graphics system 102 can use the augmented layer to generate a layered augmented puppet and output the layered augmented puppet such that the layered augmented puppet, when animated, can be perceived as making the "L" phoneme or phone when the letter "L" in the word "Hello" is said by the puppet (e.g., by outputting the particular augmented layer when the puppet is making the "L" sound).

In some embodiments, one or more operations described above with respect to FIG. 2 can be used to generate an animation or video (e.g., an animated puppet or a video that includes an animated puppet). In this example, the computer graphics application 140 causes the computer graphics system 102 to generate a temporal guide for generating the animation or video. The computer graphics system 102 can use the temporal guide to control an amount of temporal flickering in the animation or video. For example, the computer graphics system 102 can generate a temporal guide that can be used to generate an animation or video that preserves an appearance of a sequence of images, frames, or layers having a particular artistic style or texture that can exhibit a certain amount of temporal flickering. In some embodiments, the computer graphics system 102 uses the temporal guide to determine an amount of temporal flickering for a video or animation and controls the temporal flickering in the animation or video based on the determined amount such that the animation or video preserves an appearance of a sequence of hand-drawn images or frames and exhibits a certain amount of temporal flickering. In some embodiments, the computer graphics system 102 uses the temporal guide to determine an amount of temporal flickering for a video or animation and controls the temporal flickering in the animation or video based on the determined amount such that the animation or video includes one or more frames, images, or layers that include a layered animated puppet performing a gesture that closely mimic a neutral gesture or position of the character and also exhibits a certain amount of temporal flickering among various poses or gestures performed by the layered animated puppet. For instance, the computer graphics system 102 can create various individual layers as described above and each layer can include a character performing one or more gestures. In this example, the computer graphics system 102 can generate one or more stylized layers in which the character is in a neutral position (e.g., sitting still) and one or more stylized layers in which the character is performing various gestures. The computer graphics system 102 can generate a layered puppet using the various stylized layers. The computer graphics system 102 can user the layered puppet to create a video or animation and use the temporal guide to control the amount of temporal flickering among stylized layers in which the layered is in a neutral position and stylized layers in which the layered puppet is performing various gestures.

In some examples, the computer graphics system 102 can generate the temporal guide by advecting an individual layer (e.g., an individual layer created in block 204) or an augmented layer (e.g., an augmented layer generated in block 208) using an underlying motion field. The computer graphics system 102 can then generate the temporal guide by blurring the advected layer or advected augmented layer used to create an animation or video. In this example, the computer graphics system 102 can use the generated temporal guide to generate a video or animation that preserves an appearance of a sequence of images, frames, or layers having a particular artistic style or texture that can exhibit a certain amount of temporal flickering. In some embodiments, the computer graphics system 102 uses the temporal guide to control the amount of temporal flickering in the sequence of images, frames, or layers by varying the amount of blur of the advected layer or advected augmented layer.

System Implementation Example

Figure 24:
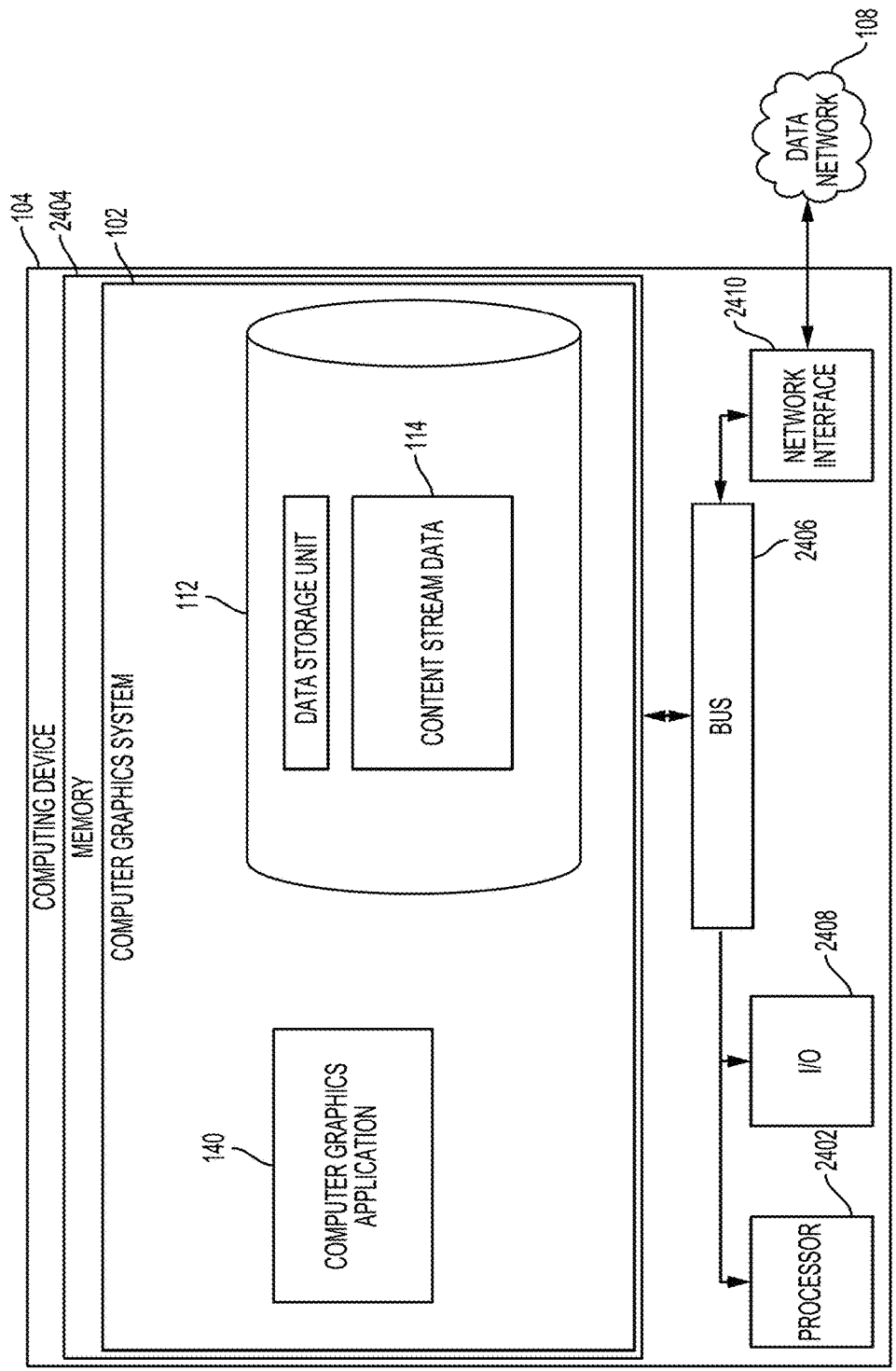
FIG. 24 is an example of a block diagram of a computing device that executes a computer graphics system to generate a layered animatable puppet using a content stream in accordance with one or more embodiments.

Any suitable computing system or group of computing systems can be used for performing the operations described herein. FIG. 24 is an example of a block diagram of a computing device 104 that executes a computer graphics system 102 to perform the operations described herein.

The depicted example of the computing device 104 includes one or more processors 2402 communicatively coupled to one or more memory devices 2404. The processor 2402 executes computer-executable program code stored in the memory device 2404, accesses information stored in the memory device 2404, or both. Examples of the processor 2402 include a microprocessor, an application-specific integrated circuit ("ASIC"), a field-programmable gate array ("FPGA"), or any other suitable processing device. The processor 2402 can include any number of processing devices, including one or more processors 2402 that are configured by program code to implement the operations described above, such as the operations depicted in FIGS. 2 and 21-23 that are described with respect to processing devices.

The memory device 2404 includes any suitable non-transitory computer-readable medium for storing the computer graphics system 102. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. One or more memory devices 2404 are used to implement the operations described above, such as the operations depicted in FIGS. 1-2 and 21-23 that are described with respect to one or more non-transitory computer-readable media.

The computing device 104 may also include a number of external or internal devices such as input or output devices. For example, the computing device 104 is shown with an input/output ("I/O") interface 2408 that can receive input from input devices or provide output to output devices. A bus 2406 can also be included in the computing device 104. The bus 2406 can communicatively couple one or more components of the computing device 104. In some embodiments, the bus 2406 is used to implement the operations described above with respect to FIGS. 1-2 and 21-23 that involve communicating signals via a data bus.

The computing device 104 executes program code that configures the processor 2402 to perform one or more of the operations described above with respect to FIGS. 1-2 and 21-23. The program code includes, for example, computer graphics application 140 or other suitable applications that perform one or more operations described herein. The program code may be resident in the memory device 2404 or any suitable computer-readable medium and may be executed by the processor 2402 or any other suitable processor. In some embodiments, the program code described above is stored in the memory device 2404, as depicted in FIG. 24. In additional or alternative embodiments, the program code described above is stored in one or more memory devices accessible via a data network.

The computing device 104 accesses the content stream data 114 in any suitable manner. In some embodiments, the content stream data 114 is stored in one or more memory devices accessible via a data network 108. In additional or alternative embodiments, some or all of the content stream data 114 is stored in the memory device 2404.

The computing device 104 depicted in FIG. 24 also includes at least one network interface 2410. The network interface 2410 includes any device or group of devices suitable for establishing a wired or wireless data connection to one or more data networks 108. Non-limiting examples of the network interface 2410 include an Ethernet network adapter, a modem, and/or the like. The computing device 104 is able to communicate with one or more servers or other computing devices via the data networks 108. In some embodiments, the network interface 2410 is used to implement the operations described above with respect to FIGS. 1-2 and 21-23 that involve communicating signals via a data network.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for generating a layered animatable puppet, the method comprising:
    accessing, by a processor, a plurality of frames of a content stream depicting a character in motion;
    identifying, by the processor, a subset of frames from the plurality of frames, the subset including (i) a first frame from the plurality of frames depicting the character performing a first gesture and (ii) a second frame from the plurality of frames depicting the character performing a second gesture different from the first gesture;

extracting, by the processor, a face of the character from the subset of frames;

generating, by the processor, (i) a first augmented layer by applying a style or texture to color information of the face as extracted from the first frame and (ii) a second augmented layer by applying the style or texture to color information of the face as extracted from the second frame;

creating, by the processor, a layered puppet by combining the first augmented layer and the second augmented layer; and outputting, by the processor, the layered puppet for animation to perform a plurality of gestures.

2. The method of claim 1, further comprising:

generating, by the processor, a plurality of augmented layers that includes the first augmented layer and the second augmented layer by performing operations comprising:

receiving, by the processor, user input indicating a command to simulate a model of the face;

generating, by the processor, a three-dimensional model of a face from a particular frame of the subset of frames; and rotating, by the processor, the three-dimensional model to generate a plurality of views of the face of the character to generate one or more of the plurality of augmented layers having a simulated pose, view, or angle of the character.

3. The method of claim 1, further comprising:

generating, by the processor, a plurality of augmented layers that includes the first augmented layer and the second augmented layer by performing operations comprising:

receiving, by the processor, user input indicating a command to caricaturize one or more frames from the subset of frames; and generating, by the processor, one or more of the plurality of augmented layers by warping or distorting the one or more frames from the subset of frames in response to receiving the command.

4. The method of claim 3, wherein warping or distorting the one or more frames from the subset of frames comprises:

identifying, by the processor, a feature of the character in an individual frame from the subset of frames;

determining, by the processor, a characteristic of the feature of the character; and warping or distorting, by the processor, the feature of the character based on the characteristic.

5. The method of claim 1, wherein identifying the subset of frames comprises:

outputting, by the processor and to a user device, a request to perform a particular gesture;

analyzing, by the processor, the content stream to determine that a gesture performed by the character in a frame of the plurality of frames corresponds to the particular gesture; and including, by the processor, the frame in the subset of frames in response to determining that the gesture of the plurality of gestures corresponds to the particular gesture.

6. The method of claim 1, wherein identifying the subset of frames comprises:

analyzing, by the processor, audio data corresponding to the content stream to identify a frame of the content stream that is aligned with a gesture that the character is making, wherein the gesture comprises a phoneme or a sound.

7. The method of claim 1, further comprising identifying a feature of the character in the content stream by:

identifying, by the processor, the feature based on a mask of the feature; and extracting, by the processor, the face of the character using the identified feature.

8. The method of claim 1, further comprising:

generating, by the processor, a temporal guide for generating a video, the video comprising the layered puppet and the temporal guide usable for determining an amount of temporal flickering in the video, wherein generating the temporal guide comprises advecting, by the processor and using an underlying motion field, an individual frame from the subset of frames or an augmented layer from a plurality of augmented layers that includes the first augmented layer and the second augmented layer;

controlling, by the processor, the amount of temporal flickering in the video by varying an amount of blur of the advected individual frame or advected augmented layer; and outputting, by the processor, the video for display via a user interface.

9. The method of claim 1, wherein extracting the face of the character from the subset of frames comprises:

applying soft masks, respectively, to the subset of frames; and modifying transparency settings of each soft mask such that the soft mask is transparent in a frame region depicting the face and opaque in a frame region depicting background content other than the face.

10. A system comprising:

a processing device; and a non-transitory computer-readable medium communicatively coupled to the processing device, wherein the processing device is configured to perform operations comprising:

accessing a plurality of frames of a content stream depicting a character in motion;

identifying a subset of frames from the plurality of frames, the subset including (i) a first frame from the plurality of frames depicting the character performing a first gesture and (ii) a second frame from the plurality of frames depicting the character performing a second gesture different from the first gesture;

extracting a face of the character from the subset of frames;

generating (i) a first augmented layer by applying a style or texture to color information of the face as extracted from the first frame and (ii) a second augmented layer by applying the style or texture to color information of the face as extracted from the second frame;

creating a layered puppet by combining the first augmented layer and the second augmented layer and using the face of the character; and outputting the layered puppet for animation to perform a plurality of gestures.

11. The system of claim 10, the operations further comprising generating a plurality of augmented layers that includes the first augmented layer and the second augmented layer by performing additional operations comprising:

receiving user input indicating a command to simulate a model of the face;

generating a three-dimensional model of a face from a particular frame of the subset of frames; and rotating the three-dimensional model to generate a plurality of views of the face of the character to generate one or more of the plurality of augmented layers having a simulated pose, view, or angle of the character.

12. The system of claim 10, the operations further comprising generating a plurality of augmented layers that includes the first augmented layer and the second augmented layer by performing additional operations comprising:
receiving user input indicating a command to caricaturize one or more frames from the subset of frames; and
generating one or more of the plurality of augmented layers by warping or distorting the one or more frames from the subset of frames in response to receiving the command.

13. The system of claim 12, wherein warping or distorting the one or more frames from the subset of frames comprises:
identifying a feature of the character in an individual frame from the subset of frames;
determining a characteristic of the feature of the character; and
warping or distorting the feature of the character based on the characteristic.

14. The system of claim 10, wherein identifying the subset of frames comprises:
identifying a feature of the character in the content stream;
analyzing the feature of the character in a frame of the plurality of frames;
detecting a gesture performed by the character in the frame based on the feature of the character; and
including the frame in the subset of frames in response to detecting the gesture performed in the frame.

15. The system of claim 10, wherein identifying the subset of frames comprises:
outputting, to a user device, a request to perform a particular gesture;
analyzing the content stream to determine that a gesture performed by the character in a frame of the plurality of frames corresponds to the particular gesture; and
including the frame in the subset of frames in response to determining that the gesture of the plurality of gestures corresponds to the particular gesture.

16. The system of claim 10, wherein identifying the subset of frames comprises:
analyzing audio data corresponding to the content stream to identify a frame of the content stream that is aligned with a gesture that the character is making, wherein the gesture comprises a phoneme or a sound.

17. The system of claim 10, the operations further comprising:
identifying a feature of the character in the content stream by:
identifying the feature based on a mask of the feature; and
extracting the face of the character using the identified feature.

18. The system of claim 10, the operations further comprising:
generating a temporal guide for generating a video, the video comprising the layered puppet and the temporal guide usable for determining an amount of temporal flickering in the video, wherein generating the temporal guide comprises advecting, using an underlying motion field, an individual frame from the subset of frames or an augmented layer from a plurality of augmented layers that includes the first augmented layer and the second augmented layer;

controlling the amount of temporal flickering in the video by varying an amount of blur of the advected individual frame or advected augmented layer; and
outputting the video for display via a user interface.

19. A non-transitory computer-readable medium having program code stored thereon that, when executed by one or more processing devices, causes the one or more processing devices to perform operations comprising:
accessing a plurality of frames of a content stream depicting a character in motion;
identifying a subset of frames from the plurality of frames, the subset including (i) a first frame from the plurality of frames depicting the character performing a first gesture and (ii) a second frame from the plurality of frames depicting the character performing a second gesture different from the first gesture;
extracting a face of the character from the subset of frames;
generating (i) a first augmented layer by applying a style or texture to color information of the face as extracted from the first frame and (ii) a second augmented layer by applying the style or texture to color information of the face as extracted from the second frame;
creating a layered puppet by combining the first augmented layer and the second augmented layer and using the face of the character; and
outputting the layered puppet for animation to perform a plurality of gestures.

20. The non-transitory computer-readable medium of claim 19, the operations further comprising generating a plurality of augmented layers that includes the first augmented layer and the second augmented layer by performing additional operations comprising:
receiving user input indicating a command to simulate a model of the face;
generating a three-dimensional model of a face of from a particular frame of the subset of frames; and
rotating the three-dimensional model to generate a plurality of views of the face of the character to generate one or more of the plurality of augmented layers having a simulated pose, view, or angle of the character.

21. The non-transitory computer-readable medium of claim 19, the operations further comprising generating, by the one or more processing devices, a plurality of augmented layers that includes the first augmented layer and the second augmented layer by performing additional operations comprising:
receiving, by the one or more processing devices, user input indicating a command to caricaturize one or more frames from the subset of frames; and
generating, by the one or more processing devices, one or more of the plurality of augmented layers by warping or distorting the one or more frames from the subset of frames in response to receiving the command,
wherein warping or distorting the one or more frames from the subset of frames comprises:
identifying a feature of the character in an individual frame from the subset of frames;
determining a characteristic of the feature of the character; and
warping or distorting the feature of the character based on the characteristic.

22. The non-transitory computer-readable medium of claim 19, wherein identifying the subset of frames comprises:
identifying a feature of the character in the content stream;

analyzing the feature of the character in a frame of the plurality of frames;

detecting a gesture performed by the character in the frame based on the feature of the character; and including the frame in the subset of frames in response to detecting the gesture performed in the frame.

* * * * *